Oct. 29, 1968   A. BECHLER   3,407,705
ATTACHMENT ON AUTOMATIC LATHE
Filed July 18, 1966   2 Sheets-Sheet 2

INVENTOR
ANDRÉ BECHLER
BY McNENNY, FARRINGTON
PEARNE & GORDON

United States Patent Office 3,407,705
Patented Oct. 29, 1968

3,407,705
ATTACHMENT ON AUTOMATIC LATHE
André Bechler, 4 Rue Centrale, Moutier,
Bern, Switzerland
Filed July 18, 1966, Ser. No. 565,916
Claims priority, application Switzerland, Aug. 10, 1965,
11,186/65
7 Claims. (Cl. 90—56)

The present invention relates to an attachment for automatic bar-stock lathes or the like. The attachment is adapted to automatically perform additional machining operations on a workpiece produced by the lathe.

In the illustrated embodiment of this invention the attachment is provided with a transfer arm mounted for pivotal oscillating movement about a pivot axis and longitudinal movement in a direction parallel to the pivot axis.

The transfer arm is driven by cams mounted on the control shaft of the lathe, so that the transfer arm moves along a predetermined path with its movement automatically timed to the lathe operation. An auxiliary chuck is mounted on the transfer arm and is carried thereby into a workpiece receiving position in which it grips a workpiece being formed by the lathe before the workpiece is cut from the bar stock. The transfer arm then carries the chuck and workpiece supported thereby to a location where the subsequent machining operations are performed.

The auxiliary chuck is mounted on the transfer arm for movement through a series of indexed positions so that a plurality of separate machining operations can be performed on the workpiece. An indexing mechanism is provided to sequentially move the chuck through its indexed positions in response to predetermined movement of said transfer arm so the indexing operation is automatically timed and separate power means for indexing are not required. The indexing mechanism includes a latch which operates to hold the chuck in the indexed positions while each of the machining operations is being performed.

After the machining operations of the attachment are completed, the workpiece is ejected from the auxiliary chuck by means which are again operated in response to movement of the transfer arm. Consequently, the entire operation of the attachment, other than the operation of the cutting tool, is powered by the control shaft of the lathe and is automatically timed with the operation of the lathe.

It is an important object of this invention to provide a novel and improved attachment for automatic bar-stock lathes, or the like, which is operatble to automatically perform a plurality of machining operations on a workpiece produced by the lathe, and wherein the workpiece is indexed between each machining operation.

It is another important object of this invention to provide a novel and improved attachment, according to the preceding object, wherein the attachment is powered and timed by a single power source on the lathe.

It is another important object of this invention to provide a novel and improved attachment, according to either of the preceding objects, wherein the attachment includes an auxiliary chuck carried by a transfer arm adapted to grip and support a workpiece, and wherein the indexing is produced in response to predetermined movements of the transfer arm.

It is still another important object of this invention to provide a novel and improved attachment, according to the last preceding object, wherein the indexing is produced by a mechanism including a cam drive operable by movement of the transfer arm and latch means to lock the auxiliary chuck in each indexed position.

It is still another important object of this invention to provide a novel and improved attachment, according to the last preceding object, which includes automatic ejection means operable to eject the finished workpiece from the auxiliary chuck in response to movement of the transfer arm.

Further objects and advantages will appear from the following description and drawings, wherein.

Figure 1:
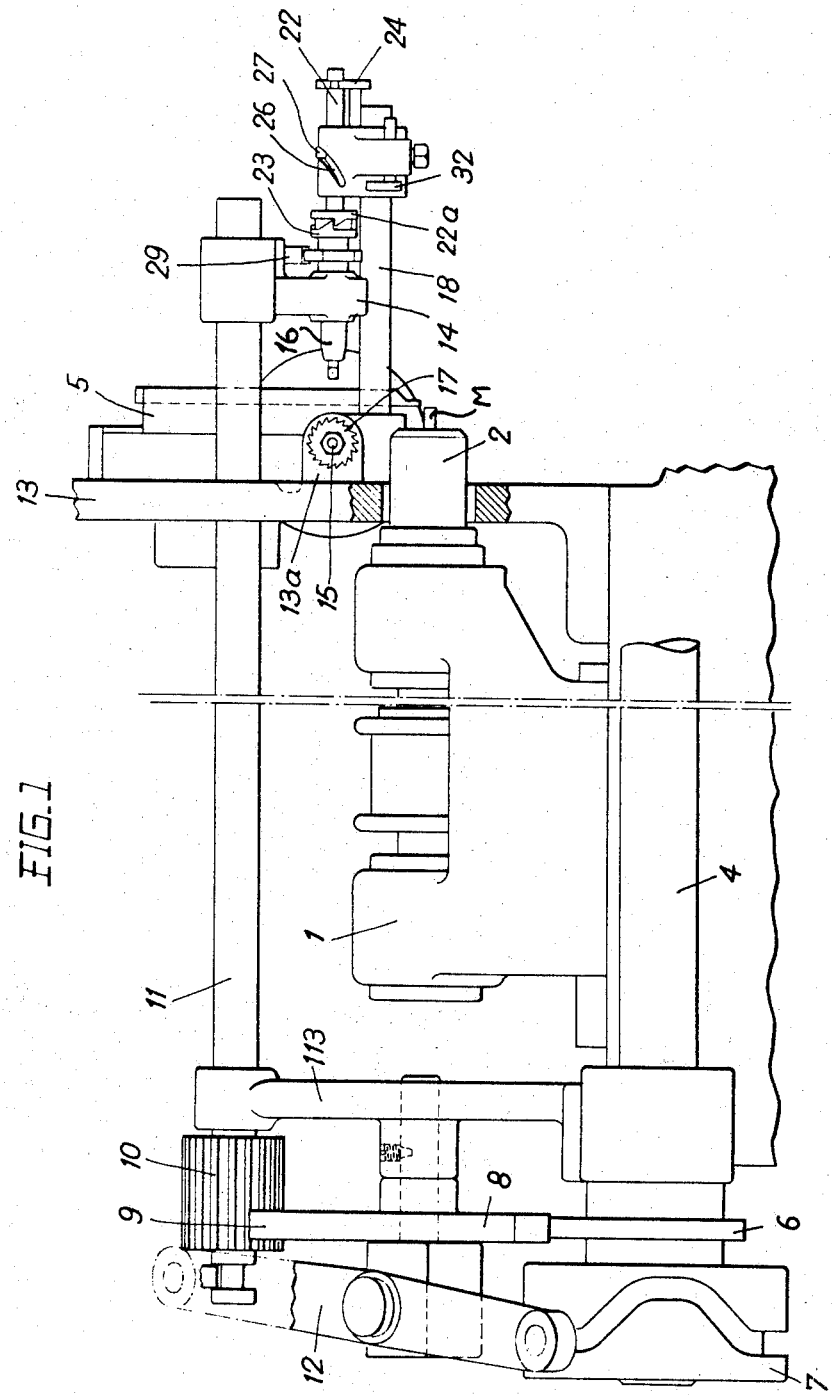
FIGURE 1 is a side elevation of a portion of an automatic lathe with an attachment incorporating this invention mounted thereon.

An attachment incorporating this invention is illustrated mounted on an automatic lathe having a head stock 1 with a work spindle 2 journaled thereon. A main collet chuck 3 is mounted on the spindle 2 and grips the bar stock M from which the workpieces are formed. A control shaft 4 is journaled on the lathe frame and by means of cams (not shown) controls the movement of tools, such as a cutoff tool supported on a silde assembly 5. This structure is typical for automatic lathes of this type and is illustrated primarily to illustrate how an attachment incorporating this invention may be applied to such a lathe.

Mounted on the end of the control shaft 4 is a plate cam 6 and a cylinder cam 7 which are connected to control the movement of a support shaft 11. The support shaft 11 is journaled on frame support members 13 and 113 for pivotal movement around its axis and longitudinal movement along its axis. The pivotal movement of the support shaft 11 is controlled by the plate cam 6 and a pivoted follower arm 8 provided with a gear segment 9 meshing with a pinion 10 mounted on one end of the support shaft 11. The pinion 10 is sufficiently long so that it remains meshed with the gear segment 19 when the support shaft 11 is moved longitudinally. The longitudinal movement of the support shaft 11 is provided by the cylinder cam 7 through a lever 12. With this arrangement both the longitudinal and pivotal movements of the support shaft 12 are controlled and powered by the rotation of the control shaft 4 in a manner timed with the operation of the lathe.

Figure 3:
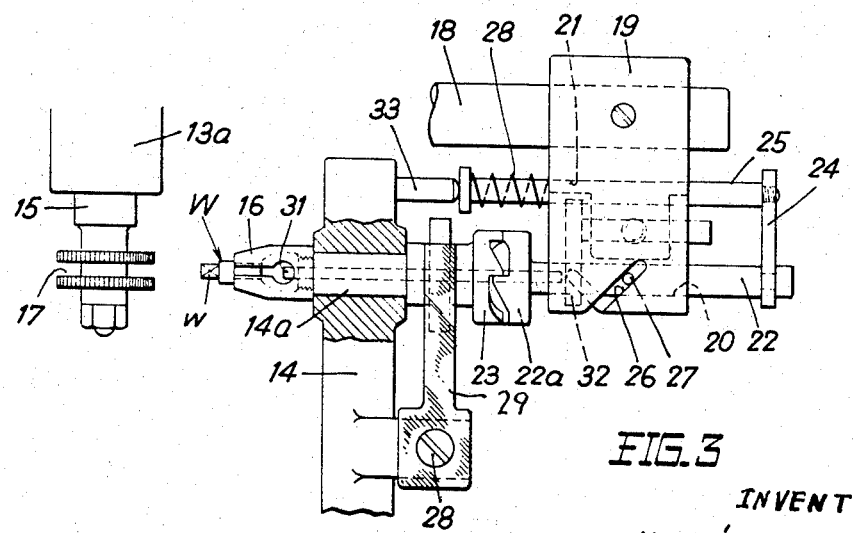
FIGURE 3 is an enlarged, fragmentary plan view of the attachment with parts broken away for purposes of illustration.

Mounted on the opposite end of the support shaft 11 is a transfer arm 14 which supports an auxiliary collet type chuck 16. The auxiliary chuck is journaled on the transfer arm 14 by means of a hollow journal 14a, so that it is rotatable relative to the transfer arm about an axis parallel to the axis of the support shaft 11. One half 23 of a one way clutch is mounted on the end of the hollow journal 14a opposite the auxiliary chuck 16. In the illustrated embodiment the secondary machining operations are performed on the workpiece W by cutters 17 mounted on a spindle 15 journaled in a bearing support arm 13a. The spindle 15 is powered by any suitable power source. As illustrated in FIGURE 3 two cutters are provided which are adapted to machine a hex w or other polygonal shapes on the end of the workpiece W.

Step-by-step indexing of the auxiliary chuck 16 is provided in response to predetermined movement of the transfer arm. The indexing mechanism includes a fixed support bar 18 mounted on the support 13. A holder 19 is mounted on the support bar 18 adjacent its outer end and is provided with two bores 20 and 21. An indexing shaft 22 is journaled in the bore 20 for sliding and rotary movement relative to the housing 19. The housing 19 is formed with a helical cam slot 26 along which a stud 27 mounted on the shaft 22 is movable. When the indexing shaft 22 is reciprocated axially it is oscillated around its axis by the cam surface 26 and stud 27.

Mounted on the forward end of the indexing shaft 22 is the other half of a one way clutch 22a. When the two clutch halves 22a and 23 are engaged they operate to rotate the auxiliary chuck 16 with the indexing shaft when the latter rotates in one direction while permitting relative rotation therebetween when the indexing shaft rotates in the opposite direction. A slide bar 25 is slidable in the bore 21 and is connected at its outer end to the indexing shaft 22 by a bracket 24 arranged to prevent relative axial movement between the two parts while permitting rotation of the indexing shaft 22 with respect to the slide bar 25. A spring 28 resiliently urges the slide bar 25 and in turn the indexing shaft 22 to the left, as viewed in FIGURE 3.

A leaf spring 29 is mounted on the transfer arm 14 by means of a screw 28 and is provided with a detent 29a adapted to fit into notches 30 symmetrically positioned around the clutch 23. The various proportions are arranged so that the detent 29a fits into one of the notches 30 when the chuck 16 is in each of the indexed positions. It, therefore, retains the chuck 16 in each indexed position as the machining operation is performed on the workpiece W. A pin 33 is mounted on the transfer arm and is in a position in alignment with the slide bar 25 when indexing is required. When the elements move to the right from the position of FIGURE 3 the pin 33 causes the slide bar 25 and in turn the indexing shaft 22 to move to the right. When this occurs the shaft 22 is rotated by the cam 26 and stud 27, and through the connection of the one way clutch parts 23 and 22a rotates the chuck 16 to the next indexed position. While this is occurring the spring 29 deflects until the next notch 30 is positioned under the detent 29a. As the transfer arm 14 moves back to the left, as viewed in FIGURE 3, the indexing shaft returns to its initial position, but the rotary movement is not transmitted to the chuck 16 because the one way clutch does not drive in that direction.

Figure 2:
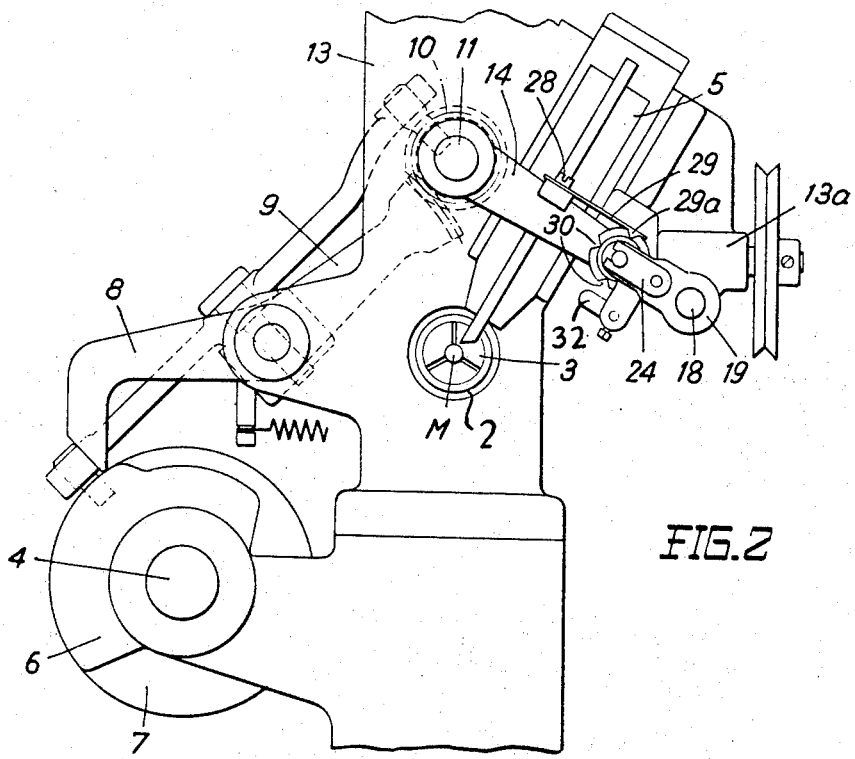
FIGURE 2 is an end view of the attachment.

In order to provide automatic ejection of the workpiece W from the chuck 16 after the machining operations are completed, an ejection pin 31 is located in the central bore of the hollow journal 14a. It extends to the right beyond the end of the clutch half 23. During normal indexing operation the ejection pin extends into a hollow bore in the indexing shaft and does not affect the indexing operation. However, when the ejection is to take place the transfer arm 14 is moved in a clockwise direction, as illustrated in FIGURE 2, to position the ejection pin 31 in alignment with a stop 32 mounted on the housing 19. When this occurs movement of the transfer arm to the right causes the ejector pin 31 to push the workpiece W out of the chuck.

The operation of the attachment is as follows. In the first portion of the cycle of operation the plate cam 6 rotates the support shaft 11 and in turn the transfer arm 14 to position the auxiliary chuck in alignment with the main chuck 3. The cylinder cam 7 then moves the transfer arm 14 to the left, as viewed in FIGURE 1, until the end of the workpiece being formed by the main lathe is positioned in the auxiliary chuck 16. This occurs before the workpiece is severed from the bar stock M.

When the cutoff tool severs the workpiece W from the bar stock M the plate cam 6 swings the transfer arm in an anticlockwise direction, as viewed in FIGURE 2, until it reaches the position illustrated therein. In this position the workpiece is aligned with the cutters 17 and the one way clutch half 23 is aligned with the other clutch half 22a. The cylinder cam 7 then causes the transfer arm to move to the left, as viewed in FIGURES 1 and 3, carrying the workpiece into cutting engagement with the cutter 17 to perform the first operation.

After the first cutting operation is completed the cylinder cam 7 moves the transfer arm to the right, as viewed in FIGURES 1 and 3, causing the clutch half 23 to engage the clutch half 22a and the pin 33 to engage the slide bar 25. Continued movement to the right beyond the position of FIGURE 3 causes the indexing shaft 22 to rotate and in turn rotate the auxiliary chuck to the next indexing position. When this occurs the detent 29a drops into the next notch 30 and movement back to the position of FIGURE 3 does not produce additional rotation of the chuck.

The cylinder cam 7 provides this movement for indexing and subsequently moves the transfer arm to the left, so that a second machining operation is performed. The cycle of operation is repeated until the workpiece is finished. At that time the plate cam 6 rotates the transfer arm 14 to bring the ejector pin 31 into alignment with the stop 32. Movement to the right caused by the cylinder cam 7 then causes the ejector pin to push the finished workpiece out of the auxiliary chuck 16. The cams then return the auxiliary chuck into position to receive a subsequent workpiece and the cycle is repeated.

Since all of the power for operating the attachment with the exception of the power for operating the cutters 17 is provided by the control shaft 4 of the main lathe, the timing of the attachment is properly maintained with respect to the main lathe. Also, since a simple mechanical structure is provided to produce all of the operations performed by the attachment, reliability and accuracy are maintained and the initial cost of the attachment is low.

Although a preferred embodiment of this invention is illustrated, it is to be understood that various modifications and rearrangements of parts may be resorted to without departing from the scope of the invention as defined in the following claims.

What is claimed is:

1. An attachment for an automatic lathe or the like comprising a frame, a transfer arm mounted on said frame actuating means providing pivotal movement and longitudinal movement of said arm, whereby an auxiliary chuck on said transfer arm can grip a workpiece formed by said lathe and relocate and support said workpiece for subsequent machining operations, said chuck being mounted on said transfer arm for movement relative thereto between a plurality of indexed positions, and indexing means operable to progressively move said chuck to said indexed positions in response to predetermined movement of said transfer arm, said indexing means including latch means operable to hold said chuck in said indexed positions while said subsequent machining operations are performed on said workpiece.

2. An attachment as set forth in claim 1 wherein said lathe includes a movable control member, and said transfer arm is driven by movement of said control member in timed relation to the operation of said lathe.

3. An attachment as set forth in claim 2 wherein said chuck is journaled on said transfer arm and rotated between said indexed positions, and said indexing means includes cam means operable to produce oscillating pivotal movement in response to said predetermined movement of said transfer arm, and a one way drive operable to rotate said chuck in response to one direction of said oscillating pivotal movement.

4. An attachment as set forth in claim 3 wherein said cam means includes a shaft slidable along its axis, a helical cam operable to oscillate said shaft in response to axial movement thereof, and means producing axial movement of said slidable shaft in response to longitudinal movement of said transfer arm.

5. An attachment as set forth in claim 1 wherein said latch means includes a detent resiliently urged into a latching position to hold said chuck in said indexed position.

6. An attachment as set forth in claim 1 wherein ejector means are provided to eject a finished workpiece from said chuck, said ejector means being operable in response to further predetermined movement of said transfer arm.

7. An attachment as set forth in claim 6 wherein pivotal movement of said transfer arm moves said chuck from an indexing position to an ejecting position and similar longitudinal movement of said transfer arm operates both said indexing means and said ejector means.

References Cited

UNITED STATES PATENTS

| 2,356,226 | 8/1944 | Delahan et al. | 10—162 X |
| 2,375,789 | 5/1945 | Hungerford | 90—11 |
| 2,677,169 | 5/1954 | Cybulski | 90—56 X |

FOREIGN PATENTS

| 1,141,510 | 9/1960 | Germany. |

WILLIAM W. DYER, JR., *Primary Examiner.*

G. WEIDENFELD, *Assistant Examiner.*